XEROGRAPHIC PROCESSING APPARATUS

Filed Oct. 1, 1962 8 Sheets-Sheet 1

INVENTORS
THOMAS C. MURRAY
ROBERT H. LIVA
NORBETT H. KAUPP

Dec. 8, 1964 T. C. MURRAY ETAL 3,160,057

XEROGRAPHIC PROCESSING APPARATUS

Filed Oct. 1, 1962 8 Sheets-Sheet 2

INVENTORS
THOMAS C. MURRAY
ROBERT H. LIVA
NORBETT H. KAUPP

XEROGRAPHIC PROCESSING APPARATUS

Filed Oct. 1, 1962 8 Sheets-Sheet 3

INVENTORS
THOMAS C. MURRAY
ROBERT H. LIVA
NORBETT H. KAUPP

INVENTORS
THOMAS C. MURRAY
ROBERT H. LIVA
NORBETT H. KAUPP

Dec. 8, 1964 T. C. MURRAY ETAL 3,160,057

XEROGRAPHIC PROCESSING APPARATUS

Filed Oct. 1, 1962 8 Sheets-Sheet 5

INVENTORS
THOMAS C. MURRAY
ROBERT H. LIVA
NORBETT H. KAUPP

XEROGRAPHIC PROCESSING APPARATUS

Filed Oct. 1, 1962 8 Sheets-Sheet 6

INVENTORS
THOMAS C. MURRAY
ROBERT H. LIVA
NORBETT H. KAUPP

XEROGRAPHIC PROCESSING APPARATUS

Filed Oct. 1, 1962 8 Sheets-Sheet 7

INVENTORS
THOMAS C. MURRAY
ROBERT H. LIVA
NORBETT H. KAUPP

INVENTORS
THOMAS C. MURRAY
ROBERT H. LIVA
NORBETT H. KAUPP 3,160,057

XEROGRAPHIC PROCESSING APPARATUS

Thomas C. Murray and Robert H. Liva, Rochester, and Norbett H. Kaupp, Newark, N.Y., assignors to Xerox Corporation, Rochester, N.Y., a corporation of New York Filed Oct. 1, 1962, Ser. No. 227,340
1 Claim. (Cl. 88—24)

This invention relates to xerographic reproduction units, and particularly, to apparatus used to charge, expose and develop a xerographic plate.

More specifically, the invention relates to an improved camera or processing unit for use with a xerographic plate to charge the xerographic plate and develop an electrostatic image on the xerographic plate.

Xerographic reproduction consists of the basic steps of charging the surface of a xerographic plate, exposing the plate surface to a light image of the copy being reproduced, developing the plate, transferring the image to a support surface, fixing the image on the support surface and cleaning the plate for reuse. Existing commercial equipment contains a camera used for mounting the copy to be reproduced and exposing the xerographic plate to a light image of that copy; a charging and developing unit in which the plate is charged prior to being exposed in the camera, developed after exposure in the camera and transferred to a support material; and a fixing or fusing unit in which the image is permanently bonded to the support surface. Movement of the xerographic plate between the camera and the charging and developing unit requires the use of a dark slide positioned over the plate surface to protect the plate from exposure to light and the resulting loss of electrostatic charge on the plate surface. This equipment is of the manual or semi-automatic type and employs a flat xerographic plate. The primary use is for reproducing line copy, or half-tone images on paper or lithographic masters.

Current commercial equipment has proven satisfactory for the use intended, but the number of steps required and the shifting and moving of the xerographic plate provides opportunity for operator error. Also the necessary use of a dark slide is awkward and subjects the plate surface to the possibility of scratching when a developer bead becomes lodged between the slide and the plate surface. This invention encompasses apparatus which eliminates the necessity of moving the xerographic plate prior to being developed and thus eliminating the use of the dark slide. It reduces the process into one continuous, integral machine operation. It reduces operator time by one-half and simplifies the training required to operate the machine. The charging, exposing and developing of the xerographic plate are accomplished, substantially, simultaneously by one plate treatment process. After a xerographic plate is inserted into the camera, the operator never touches the plate until it is withdrawn from the camera with a fully developed image thereon.

It is, therefore, the principal object of this invention to improve xerographic reproduction apparatus wherein a xerographic plate is inserted into the apparatus, is treated in a continuous machine operation, and is removed from the apparatus with a fully developed powder image of the copy being reproduced.

Further objects of this invention are to improve xerographic reproduction apparatus so that charging, exposing and development of a xerographic plate are combined into one integral plate treatment operation; the possibility of operator error is reduced; the amount of time required to train personnel to operate the apparatus is reduced; and, the amount of skill required for an operator to reproduce consistently good copy is reduced.

Various other objects and advantages will appear from the following description of one embodiment of the in-invention. The novel features will be particularly pointed out hereinafter in connection with the appended claim.

The invention is disclosed in the appended drawings, in which.

Figure 1:
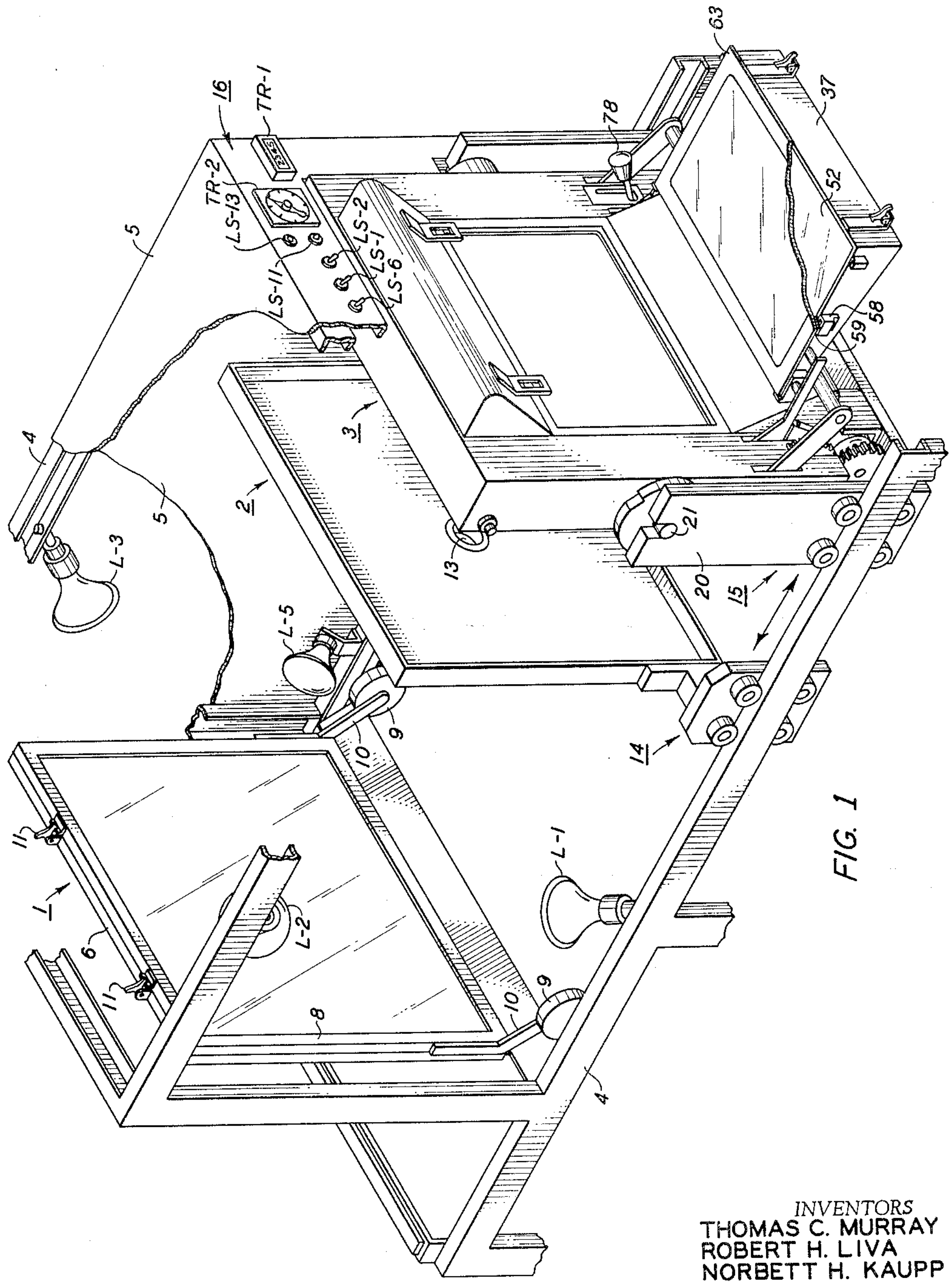
FIG. 1 is an isometric view of a xerographic apparatus of the type disclosed herein with the cover panels broken away to show the internal structure of the apparatus.

An illustrative embodiment of the xerographic apparatus disclosed herein is shown in FIG. 1. The apparatus contains three basic groups of elements generally indicated as a copy board 1, a lens mounting frame 2, and a processing or charging and developing unit 3. These members are positioned in alignment along a suitable support frame 4 and are enclosed by appropriate covers 5, so constructed to provide a light tight enclosure around the entire xerographic apparatus.

The copy board 1 is mounted on frame 4 at one end of the apparatus and consists of a mounting board 6 and a plate of clear glass 7 contained in a frame member 8. The mounting board 6 and the glass frame 8 are of the same size and are positioned so that the surface of glass 7 is in contact with the flat surface of mounting board 6. Both the mounting board 6 and the frame 8 are pivotally attached to the frame member 4 and may be moved from a vertical to a horizontal position. The frame member 4 extends beyond the back of the mounting board 6 to provide support for the copy board assembly 1 when it is in a horizontal position. A pair of counterweights 9 are attached to the glass frame 8 by means of brackets 10 to aid in the moving of the copy board assembly 1 from a horizontal to a vertical position and to hold the copy board assembly 1 in a vertical position. The glass frame 8 is pivotally connected to the bottom of the mounting board 6 so that glass 7 and the frame 8 may be moved to a vertical position while the mounting board 6 remains in a horizontal position permitting the camera operator to place the copy to be reproduced on the mounting board 6. At this point, the glass 7 and frame 8 are moved from a vertical to a horizontal position and held against the mounting board 6 by means of latches 11. The entire copy board assembly including the glass 7, the mounting board 6 and the copy to be reproduced is moved to a vertical position wherein the copy to be reproduced is held in the same relative position on the mounting board by a pressure between the glass 7 and the mounting board 6. The copy is now in position to be reproduced.

A battery of illuminating lamps L–1, L–2, L–3 and L–4 are mounted on the frame 4 and directed to illuminate the copy in the board 1. Lamp L–4 cannot be seen in FIG. 1.

The lens mounting frame 2 contains an optical lens 13 which directs a reflected light image of the copy being reproduced into the processing unit 3 and onto a xerographic plate. The lens frame 2 is adapted to fit the covers 5 and the frame member 4 to provide a light seal preventing any light from the illuminating lamps from reaching the processing unit 3, except through lens system 13. The lens board 2 is mounted in suitable brackets and rollers 14 mounted on frame 4 and may be positioned relative to the copy board and the processing unit. Thus, the operator may adjust the focus and provide the desired enlargement or reduction of the copy being reproduced. The mechanism to move the lens board externally of the covers is not shown herein, however, any suitable mechanism, such as for example, a chain drive and a hand wheel or an electrical motor with the appropriate circuitry may be used.

The processing unit 3 is mounted on a main frame member 20 which contains a roller assembly generally indicated as 15 mounted on the support frame 4. The processing unit is likewise movable on frame 4 relative to the lens board and the copy board to provide proper focusing and enlargement or reduction, as desired. The external apparatus for moving the exposure and developing mechanism is not shown herein, but as in the case of the lens board, it may be any suitable moving means. This embodiment shows the lens board and the processing unit being movable relative to the copy board, however, the processing unit may be held in a stationary position and the lens board and copy board made movable to achieve the same results. A control panel, generally designated 16, is positioned adjacent to the processing unit 3 and, herein, shown as being on the covers 5 above the processing unit. However, the control panel 16 may be positioned at any location found desirable for operator convenience.

Figure 4:
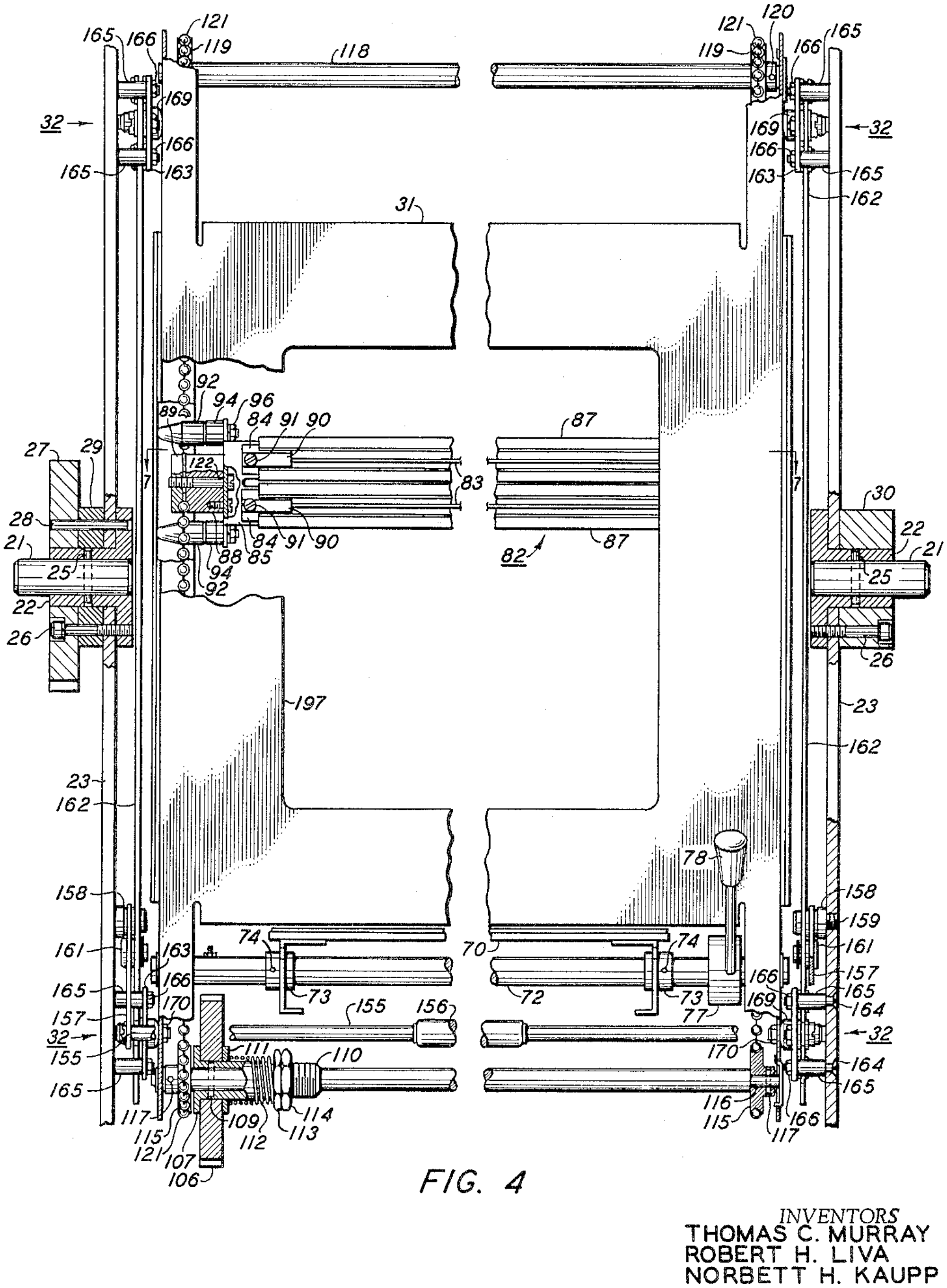
FIG. 4 is a detailed sectional view taken along line 4—4 of FIG. 3.

The main frame 20 rotatably supports the processing unit 3 by means of a pair of shafts 21 supported by bushings 22 mounted in the mechanism frame members 23, as seen in FIG. 4. The shafts 21 rotate in nylon bearings 24 mounted in the main frame 20. The shafts 21 are secured to the bushing 22 by means of pin 25 and the bushing 22 is secured to the frame 23 by means of bolts 26. The processing unit, frame and bushings all rotate with the shaft 21 as it turns in bearing 24 of main frame 20. Also mounted on the bushing 22 is a cam 27, which will be described more fully hereinafter. The cam 27 contains an alignment pin 28 and is spaced from the frame 23 by means of spacer 29. The shaft on the opposite side of the processing unit contains a spacer 30 to provide proper alignment to the unit with respect to the main frame 20. The alignment pin 28 passes through cam 27, through spacer 29, through frame 23 and through the flanged side of bushing 22, to ensure proper alignment of the cam 27 with respect to the frame 23. Between the side frame members 23 there is an electrode plate holder 31, as seen in FIG. 4, movably attached to the side frame members 23 by means of an electrode plate adjustment assembly generally designated 32 in FIGS. 4 and 6. The electrode plate adjustment assembly will be discussed in detail hereinafter.

The processing unit 3 includes a housing 12 containing a front cover 33, a top cover 34 and a bottom cover 35, and a back plate 36. Mounted on the front cover 33 is a plate holder adapted to secure a xerographic plate in the processing unit for exposure and developing and, herein, shown as a door 37 consisting of two triangular shaped side plates 38, a top structural support member 39, and a cover member 40. Attached to the door by means of bolts 42 is a pair of hinge members 41. The hinges 41 are pivotally mounted on a block 43 attached to the front cover 33 by means of screw 44. The door pivots about the block 43 to a horizontal position as shown in FIG. 1, and when closed, the door is held in position against the front cover 33 by means of a latch 45 mounted on the door cover 40 by means of bracket 46 and pin 47. The bracket 46 is attached to the door 37 by means of screws 48. A catch 49 is attached to a developer cover 50 by means of screw 51 in a position to mate with latch 45 and hold the door 37 against the front cover 33.

Figure 2:
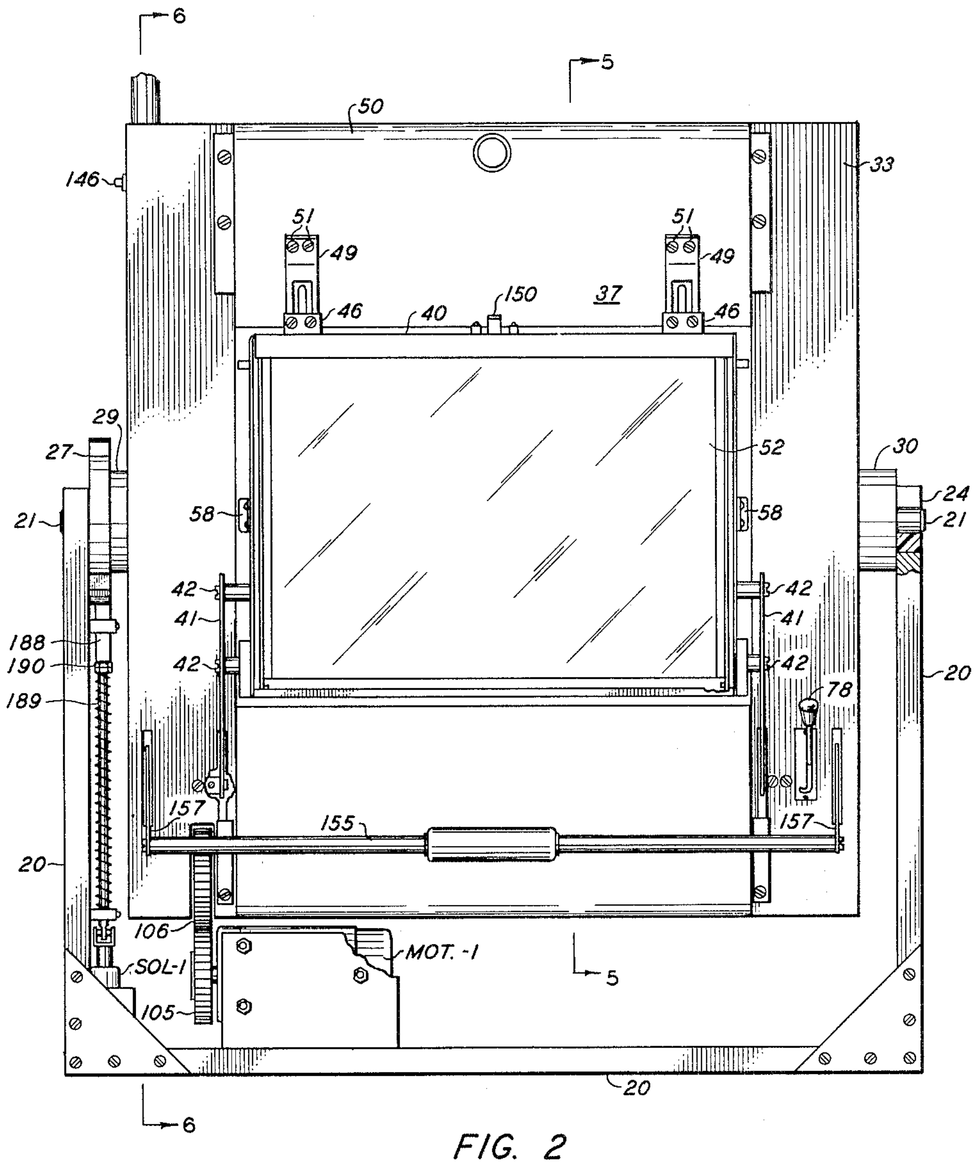
FIG. 2 is a front view of the charging and developing unit of the apparatus shown in FIG. 1.

Mounted in the door is a viewing platen 52, such as ground glass or frosted plastic, mounted in a pivotably supported frame 53 supported by pin 57 mounted in the side plates 38. The platen 52 and the frame 53 may be moved forward to put the platen in the same respective position as a xerographic plate would be if it were supported in the door, thus, allowing the image to be reproduced to be viewed in the platen. When the door is opened or in a horizontal position, the viewing platen falls to the opposite side of the door in an inoperative position, thus permitting a xerographic plate to be positioned in the door. A series of positioning guides 54 are mounted on the door 37 to permit accurate location of the xerographic plate and registration of the plate with respect to the copy on the copy board 1. The platen 52 and frame 53 are held in position away from the xerographic plate 63 by means of a retaining latch 150, shown in FIG. 2.

Figure 5:
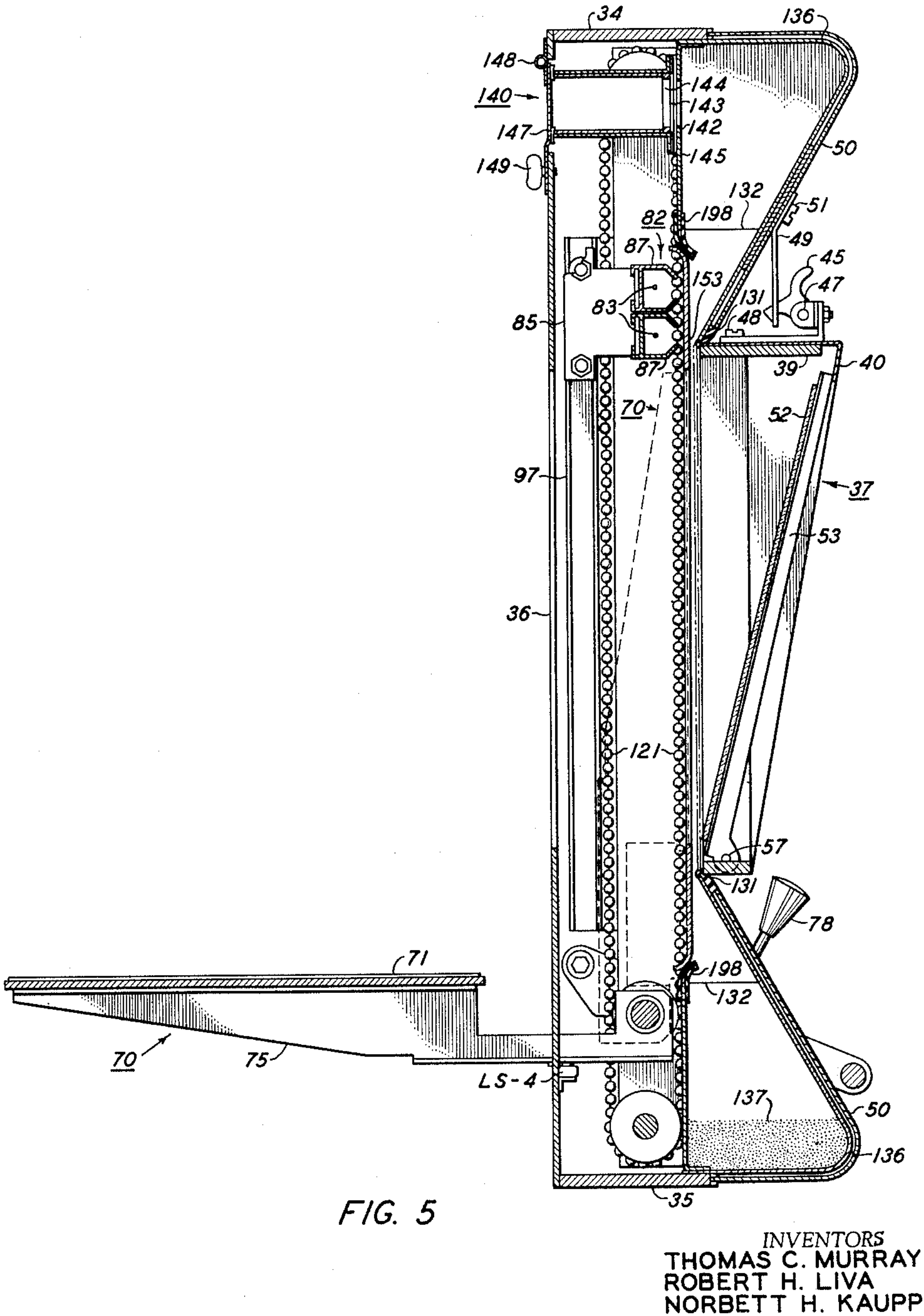
FIG. 5 is a detailed sectional view taken along line 5—5 of FIG. 2.

An electrode door, generally designated 70, containing an electrode plate 71 is mounted on a shaft 72 supported by the electrode plate holder 31. Collars 73, as seen in FIG. 4, are pinned to shaft 72 by pins 74 and contain door support members 75. The electrode plate door 70 is movable from an open or horizontal position, as shown in FIG. 5, to a vertical position (shown in dotted lines) wherein the electrode plate 71 covers an equivalent size opening 76 in the electrode plate holders 31. A resilient gasket member, not shown, is provided around the outer edge of the electrode door and the electrode plate holder when the electrode door is in a vertical position. Also mounted on shaft 72 is a collar 77 containing a handle 78 for rotating the shaft 72 and moving the electrode plate door from a horizontal position to a vertical position. An opening 79 is provided in the cover plate 33 for electrode plate door handle 78.

*Charging*

Figure 7:
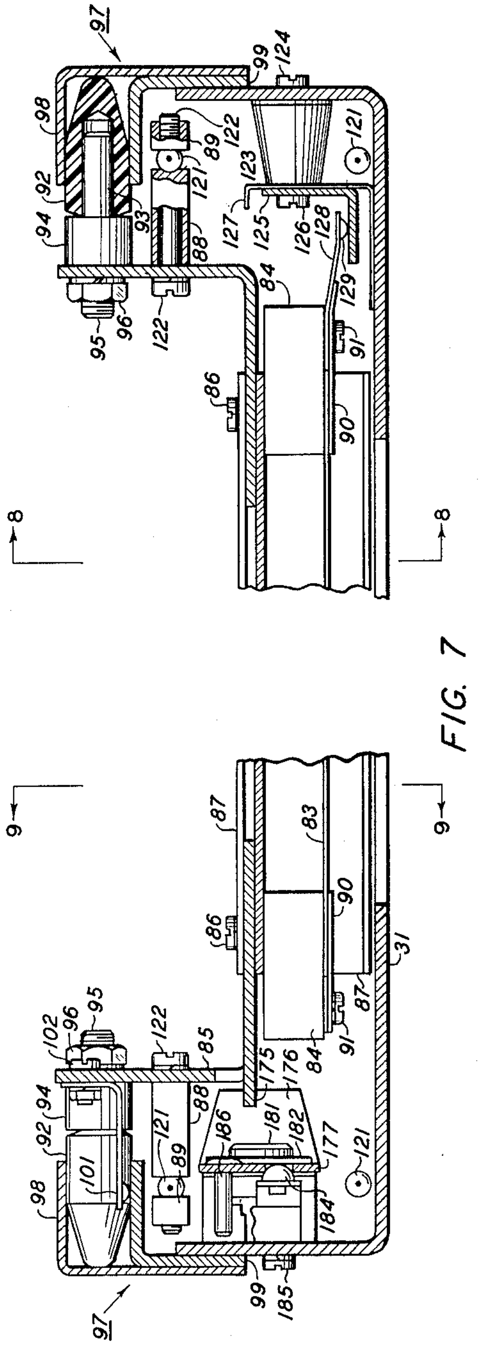
FIG. 7 is a detailed, enlarged, sectional view taken along line 7—7 of FIG. 4.

When a xerographic plate 63 is placed in the door 37 and the door is closed, the plate is in the position shown in FIG. 5 and is ready to receive a uniform electrostatic charge on its surface. A corona discharge device, herein shown as a two-wire corotron 82, is used to plate the electrostatic charge on the surface of the plate. As seen in FIGS. 4, 5 and 7, the corona device consists of wires 83, mounted in insulating blocks 84 supported on a corotron bracket 85 by means of screws 86. The wires 83 are held on the insulating block 84 by means of metal strips 90 and screws 91. A pair of corotron shields 87 enclose the wires on three sides and are attached to the corotron bracket by means of screws 86. The corotron bracket 85 contains a pair of rollers 92 on each end. The rollers are freely mounted on shafts 93, which contain a spacer section 94 and a lug 95. The lug 95 passes through the corotron bracket 85 and is secured thereto by nut 96. The rollers 92 fit into corotron tracks 97 and are freely movable therein. The corotron track consists of an outside rail 98 and an inside rail 99. The corotron is driven from a motor MOT–1, seen in FIG. 2, through a drive gear 105 which meshes with the corotron drive gear 106. The motor MOT–1 is a reversible motor capable of driving the corotron in either an upward direction or a downward direction depending on the position of the corotron prior to charging. The corotron drive gear 106 is freely mounted on a flanged bushing 107. The flanged bushing 107 is secured to a drive shaft 108 by means of pin 109. The drive shaft 108 is rotatably mounted in side flanges of the electrode plate holder 31. The flanged bushing 107 has a threaded end 110. A washer-shaped pressure disc 111 is seated around the flanged bushing bearing against the corotron drive gear 106. A compression spring 112 is also around the flanged bushing 107 and bears against the pressure disc 111. The spring is held in place by nut 133 and lock or jam nut 114. The compression spring 112 forces the pressure disc 111 against the corotron drive gear 106, which is abutted on the opposite side by the flange of the flange bushing 107. Thus, a friction drive arrangement is set up, whereby, the motion imparted to gear 106 is transmitted through the bearing surface of the flange of bushing 107 through pin 109 to shaft 108 producing rotary motion. In the event there is a corotron jam, the gear 106 will slip on bushing 107 providing a safety clutch arrangement. On each end of the corotron drive shaft 108 is mounted a chain sprocket 115 secured to an undercut portion of the shaft 116 by a pin 117. On the upper end of the flanged portion of the electrode plate holder 31 there is mounted a corotron idler shaft 118 containing two chain drive sprockets 119 securely mounted by means of pin 120. A pair of drive chains 121 extend between the lower sprockets 115 and the upper sprockets 119. As seen in FIGS. 4 and 7, the corotron bracket 85 is attached to the chains 121 by means of a chain clamp 88, a chain clamp plate 89 and bolt 122. The reversible motor MOT–1 drives gears 105 and 106 which in turn rotate drive shaft 108 containing lower chain sprockets 115, driving the chains 121 and moving the corotron 82 either upward or downward depending upon the operating direction of the motor MOT–1.

Figure 9:
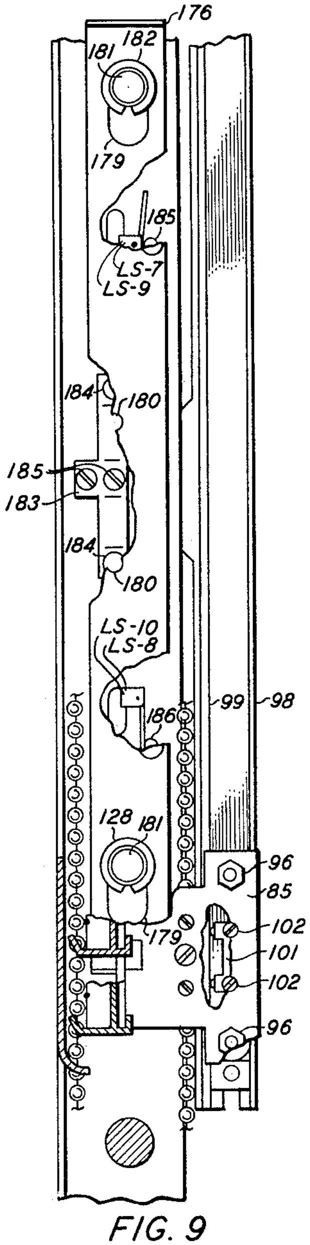
FIG. 9 is a detailed, enlarged sectional view taken along line 9—9 of FIG. 7; and, FIG. 10 is a schematic wiring diagram of the camera illustrated in FIG. 1.
Figure 8:
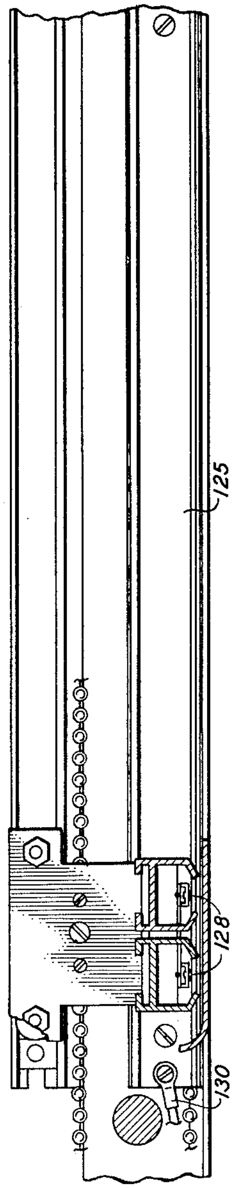
FIG. 8 is an enlarged, detailed, sectional view taken along line 8—8 of FIG. 7.

Mounted on one side of the electrode plate 31 is a pair of support members 123, only one of which is shown in FIG. 7. The support member 123 is attached to the electrode plate by means of bolt 124. Attached to the support member 123 is a power rail 125 by means of screw 126. The power rail is insulated from the support member by means of a fish paper insulator 127. A power pick-up contact 128 is attached to the corona wires 83 with the contact point 129 riding on the power supply rail 125. Power is supplied to the power rail by lead wire 130, shown in FIG. 8, from a power supply PS–1, not shown. On the opposite end of the corotron 82 is a pair of ground contacts 101, as seen in FIGS. 7 and 9. The ground contacts 101 ride on the inside rail 99 and are secured to the corotron bracket 85 by screws 102, to provide a ground for any electrostatic charge picked up by the corotron bracket 85 from the corona wires 83.

*Developing Apparatus*

Figure 3:
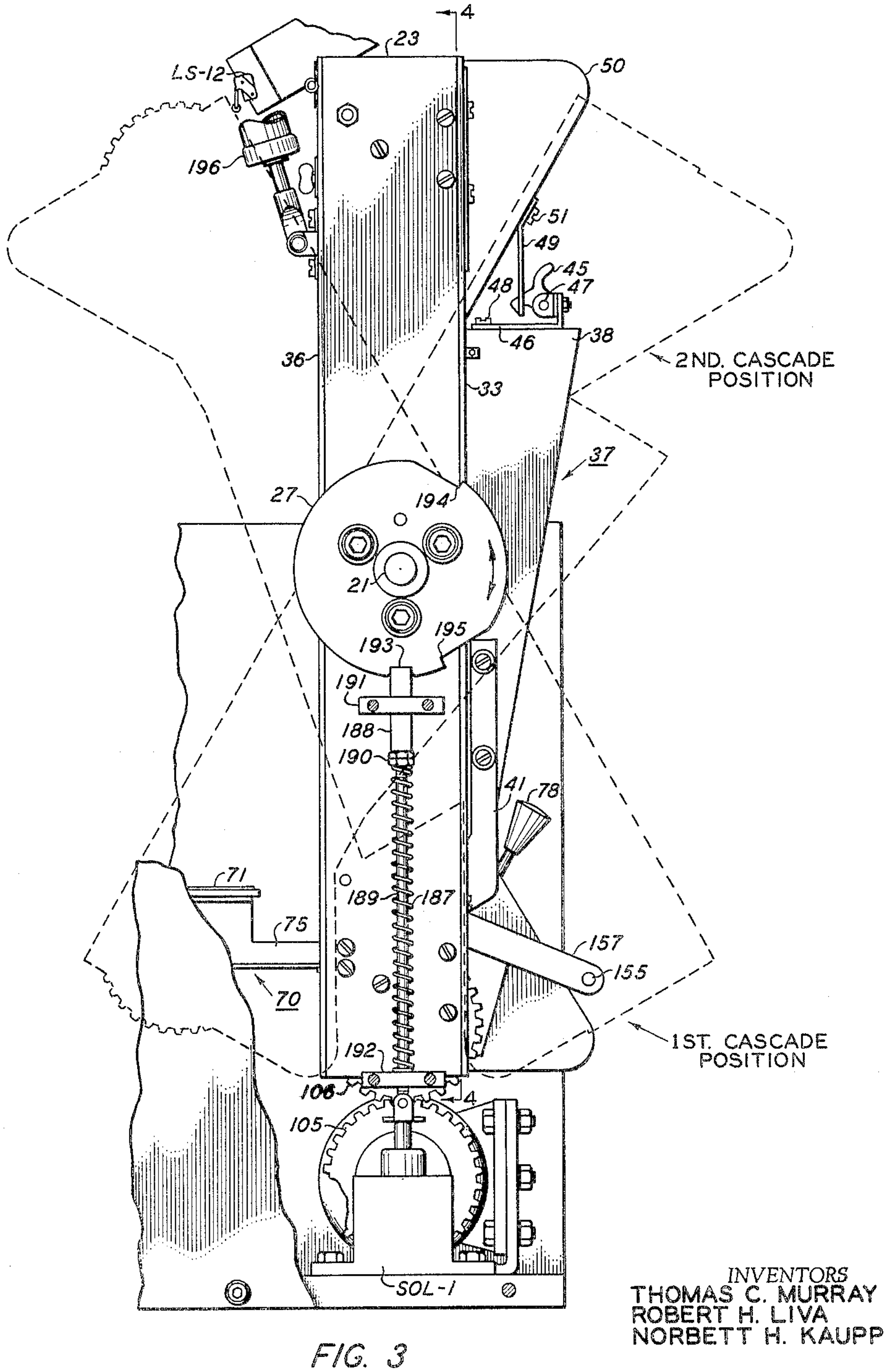
FIG. 3 is a side view of the charging and developing unit of the apparatus shown in FIG. 1.

The developing apparatus consists of two containers or developer pods 136, an electrode plate 71 and electrode plate door 70. The developer pods are enclosed by the developer housing 50. The lower developing pod 136 contains a supply of developer material 137 consisting of a resinous toner powder and a carrier bead. The developer pods 136 are enclosed on all sides except the top of the bottom pod and the bottom of the top pod which contain a slot-like opening 153 between the pods 136 and the electrode plate holder 31. There is a strip of resilient polyurethane 131 along the top edge of the bottom pod and along the bottom edge of the top pod providing a seal for the xerographic plate 63 when the door 37 is closed. A similar strip of polyurethane 132 is attached to the sides of the developer pods 136 and extends along the sides of the xerographic plate 63 providing support for the xerographic plate and a seal between the xerographic plate and the electrode plate holder 31. There is a passageway between the polyurethane seals 132 enclosed by the electrode plate 31 and the xerographic plate 63. This passageway is large enough to pass the carrier bead and resinous toner powder of the developer material 137 from one developer pod 136 across the xerographic plate 63 to the other developer pod. As the processing unit is rotated into the first cascade position, as shown by the dotted lines in FIG. 3, and labeled "first cascade position," the developer material in the lower pods flows across the xerographic plate into the upper pod. As the unit is returned to the second cascade position, as indicated by the dotted lines and labeled "second cascade position," the developer material returns to the bottom pod.

An opening 138 in the top developer pod is provided to supply new carrier beads to the developer material 137 or to remove the developer charge from the developer pods. A toner dispenser 140 is provided behind the top developer pod 136 and contains a supply of toner material 141. The toner dispenser 140 is adjacent an opening 142 in the developer pod 136. Extending across the opening is a slotted member 143 which is stationary. A similarly slotted movable member 144 is provided adjacent to the slotted member 143 in the toner dispenser 140. A sealing member 145 is provided between the toner dispenser and the developer pod. A push rod (not shown) runs from button 146 to the movable slotted member 144. The slots in the slotted member 143 and the movably slotted member 144 are not normally aligned, as the button 146 is depressed the push rod moves the slotted member 144 into a position whereby the slots in members 143 and 144 are aligned. If the button 146 is depressed when the unit is in a horizontal position or a non-vertical position, toner 141 in toner dispenser 140 will fall through the two-slotted members into the developer pod, thus replenishing the toner supply in the developer pods. There is a door 147 on the back of the toner dispenser 140 hinged at 148 and held shut by a thumb screw 149. The supply of toner 141 in the toner dispenser 140 may be replenished through door 147 when necessary.

*Tone and Line Copy Adjustment Mechanism*

Figure 6:
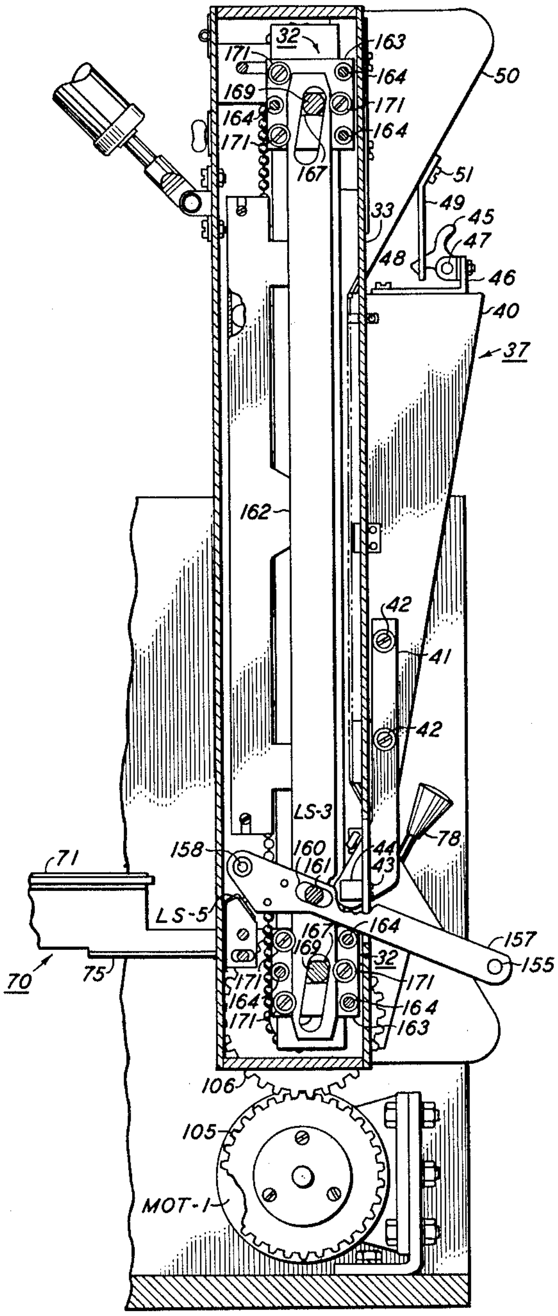
FIG. 6 is a detailed sectional view taken along line 6—6 of FIG. 2.

Referring now specifically to FIGS. 4, 6 and 9, there is a tone-liner lever bar 155 having a handle 156 extending between a pair of levers 157. The levers 157 are pivoted about a pair of pins 158 which are rigidly secured to the side frame members 23 at 159. Movement of bar 155 produces a rotational movement of lever 157 about pin 158. Lever 157 has a slot 160 containing a movable pin member 161. Pin 161 extends through an adjustment bar 162. Rotational movement of lever 157 produces a corresponding vertical movement of the movable pin member 161 and a resulting vertical movement of the adjustment bar 162. Slotted plate members 163 are positioned at the top and bottom of each adjustment bar 162. The plates 163 are rigidly secured to the side frame members 23 by means of bolts 164 and nuts 166 and spaced from the frame member 23 by means of spacers 165. Each of the plates 163 contain a horizontal slot 167 and each of the adjustment bars 162 contain a slot 168 slanted obliquely from the vertical and crossing the slot 167 in plate 163. A main 169 is secured to the flange portion of electrode plate holder 31 by means of nut 170. The main roller 169 extends through the slot 167 in plate 163 and through the slot 168 in adjustment bar 162. Three nylon rollers 171 in each of the plates 163 guide the adjustment bar 162 permitting vertical movement and preventing horizontal movement.

Movement of lever 157 produces a vertical movement of pin 161, which carries adjustment bar 162. The vertical movement of adjustment bar 162 causes roller 169 to prove in the slanted slot 168 producing a horizontal movement of the roller 169 in the slot 167. The horizontal movement of roller 169 which is rigidly attached to the electrode plate holder 31 produces a corresponding horizontal motion of the electrode plate holder 31 and all members attached thereto. The entire electrode plate holder 31, the electrode plate door 70, the corotron assembly 82, the drive shaft 108, the chain 121 and sprockets 119 are all moved toward or away from the xerographic plate 63 depending on the direction of the movement of lever 157.

In the development of xerographic images, it is desirable to be able to reproduce line copy, such as a standard typewritten sheet, without leaving toner material in the background or discharged areas, while also being able to reproduce tone or half-tone copy containing large solid areas of black or gray. Therefore, a conductive electrode plate 71 positioned close to the surface of the xerographic plate and containing an electrical potential is used to attract electrostatic lines of force on the xerographic plate and improve their ability to retain toner material during development, particularly in large solid areas. When developing line copy, the electrode plate is not necessary since the electrostatic lines of force in normal line copy reproduction is sufficient to retain a uniform coverage of toner material in the appropriate areas. The electrode plate not only strengthens the electrostatic force in the large solid areas but also strengthens any residual charge that may be left in background or discharged areas. For this reason, an electrode plate is not used when making line copy. When line copy is being reproduced, the lever 155 is placed in the line position moving the electrode plate 71 and the electrode plate holder 31 a distance of 13/32 of an inch or more away from the tone position. This movement eliminates the effect of the electrode on the xerographic plate. Also in increasing the opening between electrode plate and the xerographic plate the ability of the developer material to cascade over the xerographic plate is improved. There is less possibilty of the developer material clogging between the two plates. As seen in FIG. 5, a flexible connection 198 is provided between the developer pods 136 and the electrode plate holder 31, to allow movement of the electrode plate and still maintain the necessary seal to retain the developer material 137.

*Operation*

When a reproduction is to be made the original copy is placed on the copy board 1 as seen in FIG. 1, between the mounting board 6 and the copy glass 7. The copy board is placed in a vertical position and the lens frame 2 and the processing unit 3 are placed in the desired position to produce either enlargement or reduction of the copy as desired.

The door 37 is closed and the viewing platen 52 is moved from a position as shown in FIG. 5 forward to a position wherein the viewing platen 52 is located in a vertical position, that is, in a position wherein the viewing platen lies in the plane that the photoconductve surface of the xerographic plate will occupy during exposure.

Figure 10:
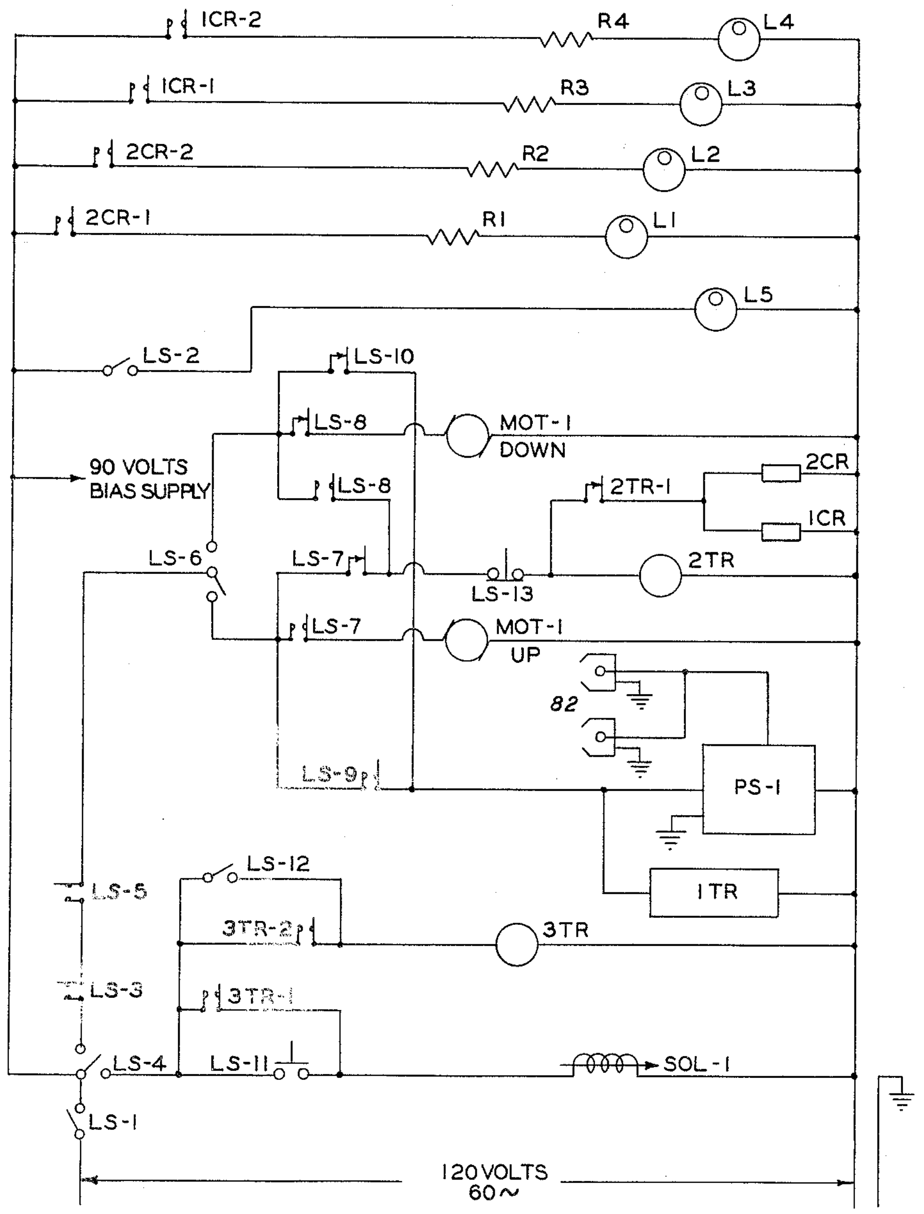

Referring now to the wiring diagram, FIG. 10, the main power switch LS–1 located on the control panel 16, as seen in FIG. 1, is closed supplying power to the entire camera. Manually operated focusing switch LS–2 is also closed illuminating a 650 watt quartz iodide focusing lamp L–5, as seen in FIG. 1. The light from focusing lamp L–5 permits the image of the document on copy board 1 to be viewed in the viewing platen 52, and any adjustments as to centering or focusing the image may be made at this time. Switch LS–2 is opened cutting off the power to lamp L–5 and the camera door 37 is opened to a horizontal position as seen in FIG. 1.

A xerographic plate 63 is now placed in position in the camera door 37 and is held in the door by means of magnetic latches 58 located on the sides of door 37. The magnetic latches attract small pads 59 of magnetic material located on the back of the xerographic plate 63. The door 37 is closed and held in a vertical position by means of latches 45 and catches 49. The xerographic plate 63 is now in position and is ready to be charged, exposed and developed.

With the processing unit 3 in a vertical position and the electrode plate door 70 in a horizontal position a switch LS–4, shown in FIG. 5, is actuated to close a circuit from the main power source to the corotron power supply and drive motors. When the electrode plate 70 is moved into a vertical or cascade position, the switch LS–4 is actuated opening the circuit to the corotron power supply and closing the circuit to the cascade timer and camera solenoid. Switch LS–4 is a protective switch preventing the operation of the corotron while the electrode plate door is closed and preventing operation of the cascade developer when the electrode plate door is open. Also, the door 37 must be in a closed position actuating an interlock microswitch LS–3 as seen in FIG. 6. A second interlock microswitch LS–5, also shown in FIG. 6, and located beneath the tone line lever, must also be in a closed position, that is, the tone line actuating mechanism must be moved to a tone position to permit charging. It is necessary that the corotron be a predetermined distance from the xerographic plate during each charging cycle to provide the correct potential to the surface of the xerographic plate. Switch LS–5 insures that the proper relationship between the corotron 82 and the plate 63 exists when the plate is charged.

To initiate charging of the xerographic plate, switch LS–6, located on control panel 16, is actuated. Switch LS–6 is a two-position switch wherein charging may be initiated in one direction if the corotron is positioned at the top of the plate as shown in FIG. 5, or, on alternate cycles, in the other direction, when it is at the bottom of the plate. Referring to FIGS. 5, 7, and 9, it is seen that the corotron 82 contains a small actuating arm 175 which protrudes from the corotron bracket 85 and is adapted to contact protuberances 176 located on the top and bottom of switch actuator 177. Switch actuator 177 consists of a flat bar 178 containing two vertical slots 179 and a pair of indent holes 180. The switch actuator 177 is guided by a pair of pins 181 mounted on the electrode plate holder 31 and extending through slots 179. A pair of snap rings 182 fit in appropriate slots on the end of pins 181 to retain the switch actuator 177. A leaf spring 183 is mounted through the electrode plate holder 31 by means of screws 185 and contains a pair of semi-spherical members 184 adapted to fit indent holes 180. Only one semi-spherical member 184 is one of the indent holes 180 at a given time thus holding the switch actuator in either an up or down position. As the corotron 82 moves to an upward position, the arm 185 contacts protuberance 176 located at the top of the switch actuator 177. As the actuator 177 moves upward, an upper switch actuating pin 185 mounted in a switch actuating bar 178 actuates a pair of limiting switches LS–7 and LS–9 mounted on the electrode plate holder 31, and a lower switch actuating pin 186 also mounted on switch actuator bar 178 releases a pair of switches LS–8 and LS–10. Releasing switches LS–8 and LS–10 cut off the power supply to the corotron drive motor MOT–1 leaving the corotron in an upper position until such time as it is necessary to charge in a downward direction. Upon charging in a downward direction, the same situation occurs in that as the corotron reaches the lower end of its travels the corotron actuating arm 175 contacts the protuberance 176 located at the lower end of switch actuator 177 causing the switch actuator bar 178 to move to a downward position actuating switches LS–8 and LS–10 and releasing switches LS–7 and LS–9.

As seen in the schematic wiring diagram of FIG. 10, the corotron drive motor MOT–1 is a reversible motor for driving the corotron either in an upward direction or a downward direction and is indicated on the diagram as two motors MOT–1 UP and MOT–1 DOWN. When the corotron is in an upper position, as shown in the diagram of FIG. 10, and it is desired to charge in a downward direction, the switch LS–6 is thrown to the right closing a circuit through switch LS–10 to power supply PS–1 to corotron 82, and actuating counter 1TR. The counter 1TR is located on control panel 16 and indicates the number of charging cycles made on the camera. The circuit through switch LS–8 is also closed and initiates the operation of motor MOT–1 DOWN to drive the corotron in a downward direction. Throwing switch LS–6 to the right opens a normally closed circuit through switch LS–6 and LS–7 to the exposure timer 2TR, releasing the timer motor and leaving the timer in a reset position. Resetting timer 2TR automatically closes contacts 2TR–1. When the corotron reaches the bottom of its travel in a downward direction, limiting switches LS–8 and LS–10 are actuated as described above, thus opening switch LS–10 and cutting off the power supply to corotron 82, and one contact of switch LS–8 is opened stopping motor MOT–1 DOWN. The other contact of switch LS–8 is closed providing a circuit to timer 2TR and through contact 2TR–1, which is in a closed position when timer 2TR is reset, to relays 1CR and 2CR. Relays 1CR and 2CR close the normally open contacts 1CR–1, 1CR–2, 2CR–1, and 2CR–2 located with resistors R–1, R–2, R–3 and R–4 in the circuits to lamps L–1, L–2, L–3 and L–4. The closing of contacts 1CR–1, 1CR–2, 2CR–1 and 2CR–2 causes illumination of the lamps L–1, L–2, L–3 and L–4, exposing the xerographic plate to a light image of the copy being reproduced. The lamps remain illuminated until the expiration of timer 2TR opens contact 2TR–1 cutting off power to relays 1CR and 2CR. Also as the corotron reaches its bottom position, switches LS–7 and LS–9 are released by upper pin 185 as stated above, thus closing switch LS–9 and opening one contact of switch LS–7 and closing the other contact of switch LS–7. When switch LS–6 is thrown to the left for the next charge and exposing cycle, the power supply and corotron will be actuated through switch LS–9 and the motor MOT–1 UP will be actuated through the closed contact of switch LS–7. The camera is automatically ready for another charge and exposing cycle.

If a double exposure of the xerographic plate 63 is desired, it may be accomplished by means of switch LS–13. Depression of switch LS–13 on control panel 16 breaks the circuit to timer 2TR through either contacts LS–7 or LS–8 which ever is in the closed position in that cycle. Breaking the circuit to timer 2TR releases the timer motor, resetting the timer 2TR and closing contacts 2TR–1 so that when switch LS–13 is released and the circuit once again completed, the illumination of lamps L–1, L–2, L–3 and L–4 is effected in the same manner as described above. The position of the charging apparatus has not been affected.

After charging and exposing the xerographic plate, handle 78 is moved to a closed position, shutting electrode plate door 70. Movement of electrode plate door 70 from a horizontal to a vertical position releases switch LS–4 breaking the charge and exposure circuit and completing the developing circuit. The electrode plate 71 on electrode plate door 70 has a constant potential of 90 volts, indicated as bias supply in the circuit diagram of FIG. 10. The potential on the electrode plate 71 is used to improve the transfer characteristics of the toner material to the xerographic plate during the development process. The door 70 also closes the opening 76 in electrode plate holder 31 and provides one wall of the passageway for the developer material 137 to pass over xerographic plate 63.

With the electrode plate door 70 in an upright position, the switch LS–4 is in a position to activate the developing circuit. At this point, the operator depresses the processing unit release switch LS–11 completing the circuit to solenoid SOL–1. The solenoid SOL–1 retracts rod 189 and cam follower 188. The follower 188 and rod 189 are guided in a pair of brackets 191 and 192 mounted on frame member 23. As follower 188 is withdrawn from an indentation 193 in the surface of the cam 27, the exposure and processing unit 3 is no longer held in a rigid vertical position and is free to be rotated. The operator then grips a handle (not shown) suitably positioned on the processing unit 3 and the entire unit 3 is pivoted about shaft 21 into a first cascade position, as shown by the dotted lines in FIG. 3. This operation is indicated as being manually performed, but it is anticipated that the entire operation could easily be performed automatically by a small drive motor suitably connected to drive the developer mechanism. The bottom rear of the mechanism 3 is elevated to a point which contacts switch LS–12 closing a circuit to timer 3TR. As the processing unit 3 is rotated switch LS–11 is released de-activating solenoid SOL–1, spring 187 forces the cam follower 188 to ride on the cam until indentation 194 is reached, whereby, the unit is held in the first cascade position until timer 3TR momentarily closes contact 3TR–1 activating solenoid SOL–1 and retracting cam follower 188. The processing unit 3 is weighted to pivot the mechanism to a second cascade position and a hydraulic mechanism 196 cushions the movement and reduces the velocity of the backswing of the mechanism to the second position, that is, until cam follower 188 abuts stop 195 of cam 27. Timer 3TR continues to operate through a holding circuit provided by contacts 3TR–2 which are closed by the initial activation of timer 3TR. After the lapse of a predetermined time interval by timer 3TR, the contacts 3TR–1 are again closed activating solenoid SOL–1 and withdrawing the cam follower 188. The processing unit 3, being properly weighted, pivots toward the vertical position and contacts 3TR–1 and 3TR–2 are both opened de-activating the solenoid and cutting off operation of the timer 3TR. The unit is now locked in the vertical position by spring 187 forcing cam follower 188 into indentation 193.

When the processing unit 3 is in the first cascade position, the developer material 137 in the lower developer pod 136 flows by gravity to the other developer pod 136 through a passageway formed by the electrode plate 71 and the xerographic plate 63. The developer 137 rolls or cascades over the xerographic plate 63 depositing toner material on the plate in the electrostatically charged areas. When the processing unit 3 is returned to the second cascade position, the developer material 137 returns by gravity to the lower developer pod 136 through the same passageway again cascading over the xerographic plate.

After the developing operation is completed and the processing unit 3 is in a vertical position, the camera door 37 may be opened and plate 63 removed with a developed xerographic image thereon. A new plate 63 may now be inserted and the charging, exposing and developing operations repeated.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

In a xerographic copying apparatus including a copyboard for holding original copy to be reproduced, lighting means to illuminate original copy mounted on the copyboard, a lens to convey a light image of the copy on the copyboard to a xerographic plate, and a processing unit for charging, exposing and developing a xerographic plate, the combination of:

a support frame, a housing rotatably supported by the frame and having an opening in the front to accommodate a xerographic plate and an opening in the back to expose a xerographic plate to a light image of copy to be reproduced, means to secure a xerographic plate in stationary position over the opening in the front of the housing to form a powder tight seal between a plate and the housing, charging apparatus located in the housing adjacent to the stationary position of a xerographic plate and movable across a plate surface to place an electrostatic charge thereon, a pair of developer pods positioned in the housing, one on each side of the opening in the front of the housing and adapted to contain developer material for developing powder images on a xerographic plate, each pod having an opening adjacent to and extending across the opening in the front of the housing so that developer material may flow from one pod across a xerographic plate covering the opening in the housing to the other pod, an electrode plate operatively associated with the housing to be movable between a first position wherein a xerographic plate may be exposed to a light image of copy to be reproduced and a second position wherein its surface is positioned adjacent to a xerographic plate secured over the opening in the front of the housing, means to vary the position of the electrode plate relative to a xerographic plate for the production of tone and line copy, and drive means to rotate the housing between an exposure position wherein a xerographic plate may be electrostatically charged by the charging apparatus and exposed to a light image of copy being reproduced, a first cascade position wherein developer material cascades from one developer pod, between the electrode plate and a xerographic plate, to the other developer pod thereby developing an image on a xerographic plate and a second cascade position wherein the developer material cascades from the developer pod back between the electrode plate and a xerographic plate to the other pod.

References Cited in the file of this patent

UNITED STATES PATENTS

| | | |
|---|---|---|
| 2,550,738 | Walkup | May 1, 1951 |
| 2,588,675 | Walkup et al. | Mar. 11, 1952 |
| 2,878,732 | Mayo et al. | Mar. 24, 1959 |
| 3,002,434 | Reuter | Oct. 3, 1961 |
| 3,009,402 | Crumrine et al. | Nov. 21, 1961 |